US012731576B2

(12) United States Patent
Wada et al.

(10) Patent No.: US 12,731,576 B2
(45) Date of Patent: Sep. 8, 2026

(54) GENERATING SUGGESTED MODIFICATIONS FOR CONFIGURING AND TRAINING AN AUTOMATIC SPEECH RECOGNITION MODEL

(71) Applicant: Cypress Semiconductor Corporation, San Jose, CA (US)

(72) Inventors: Ted Wada, Irvine, CA (US); Aidan Smyth, Irvine, CA (US); Ashutosh Pandey, Irvine, CA (US); Daniel Watson, Austin, TX (US)

(73) Assignee: Infineon Technologies Americas Corp., El Segundo, CA (US)

( * ) Notice: Subject to any disclaimer, the term of this patent is extended or adjusted under 35 U.S.C. 154(b) by 140 days.

(21) Appl. No.: 18/671,688

(22) Filed: May 22, 2024

(65) Prior Publication Data

US 2025/0363981 A1 Nov. 27, 2025

(51) Int. Cl.
*G10L 15/18* (2013.01)
*G10L 15/06* (2013.01)

(52) U.S. Cl.
CPC ............ *G10L 15/063* (2013.01); *G10L 15/18* (2013.01)

(58) Field of Classification Search
CPC .............................. G10L 15/063; G10L 15/18
See application file for complete search history.

(56) References Cited

U.S. PATENT DOCUMENTS

2025/0349284 A1 * 11/2025 Zhang .................. G10L 15/063

* cited by examiner

*Primary Examiner* — Mahelet Shiberou

(57) ABSTRACT

Methods and systems for receiving a trained machine learning model, receiving a test dataset, wherein the test dataset is used to evaluate the trained machine learning model, generating, based on the test dataset and the trained machine learning model, one or more suggested modifications to at least one aspect of configuring and training of the trained machine learning model, and applying the one or more suggested modifications to at least one aspect of configuring and training of the trained machine learning model.

20 Claims, 8 Drawing Sheets

Figure 3A:
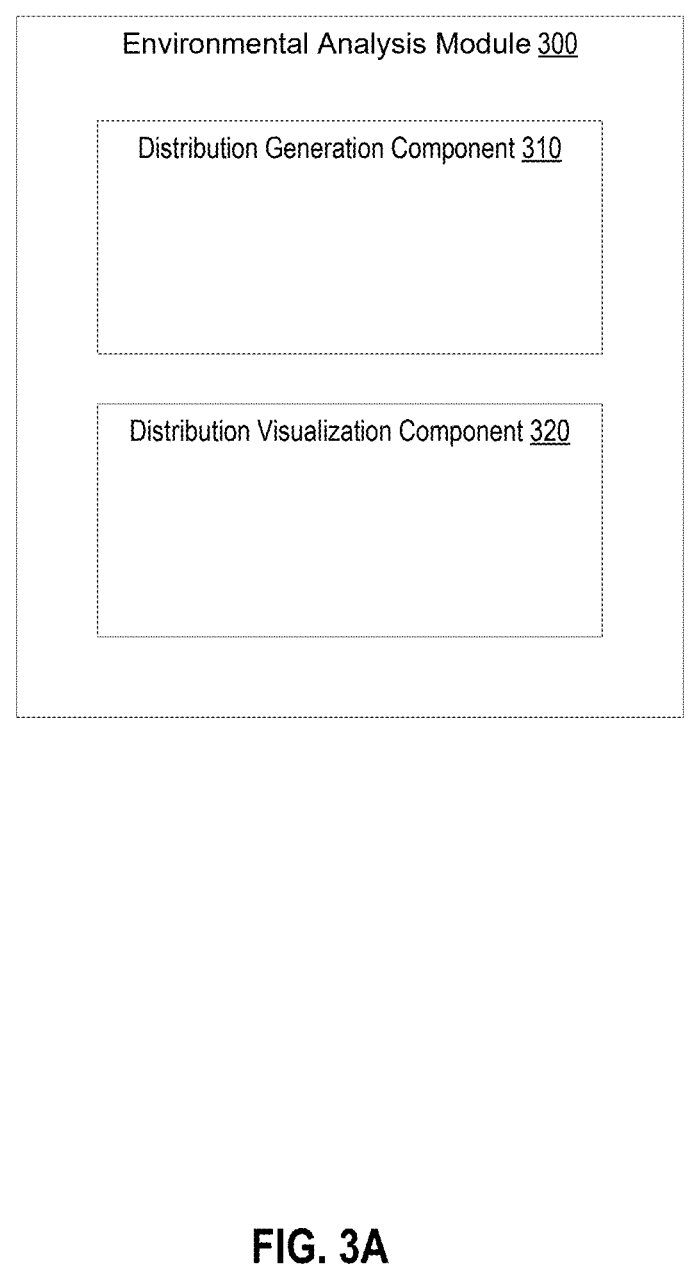

Environmental Analysis Module 300

Distribution Generation Component 310

Distribution Visualization Component 320

Remedial Analysis Module 500

Suggestion Generation Component 510

GENERATING SUGGESTED MODIFICATIONS FOR CONFIGURING AND TRAINING AN AUTOMATIC SPEECH RECOGNITION MODEL

TECHNICAL FIELD

Aspects and implementations of the present disclosure relate to generating suggested modifications for configuring and training an automatic speech recognition model.

BACKGROUND

Speech-based discriminative tasks have gained immense traction in machine learning, revolutionizing how we interact with technology and offering a multitude of applications, ranging from voice-activated assistants to automated customer service solutions and healthcare diagnostics.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A illustrates an example environmental analysis module of the error analysis and suggestion tool, in accordance with implementations of the present disclosure.

FIG. 5 illustrates an example remedial analysis module of the error analysis and suggestion tool, in accordance with implementations of the present disclosure.

DETAILED DESCRIPTION

Figure 1:
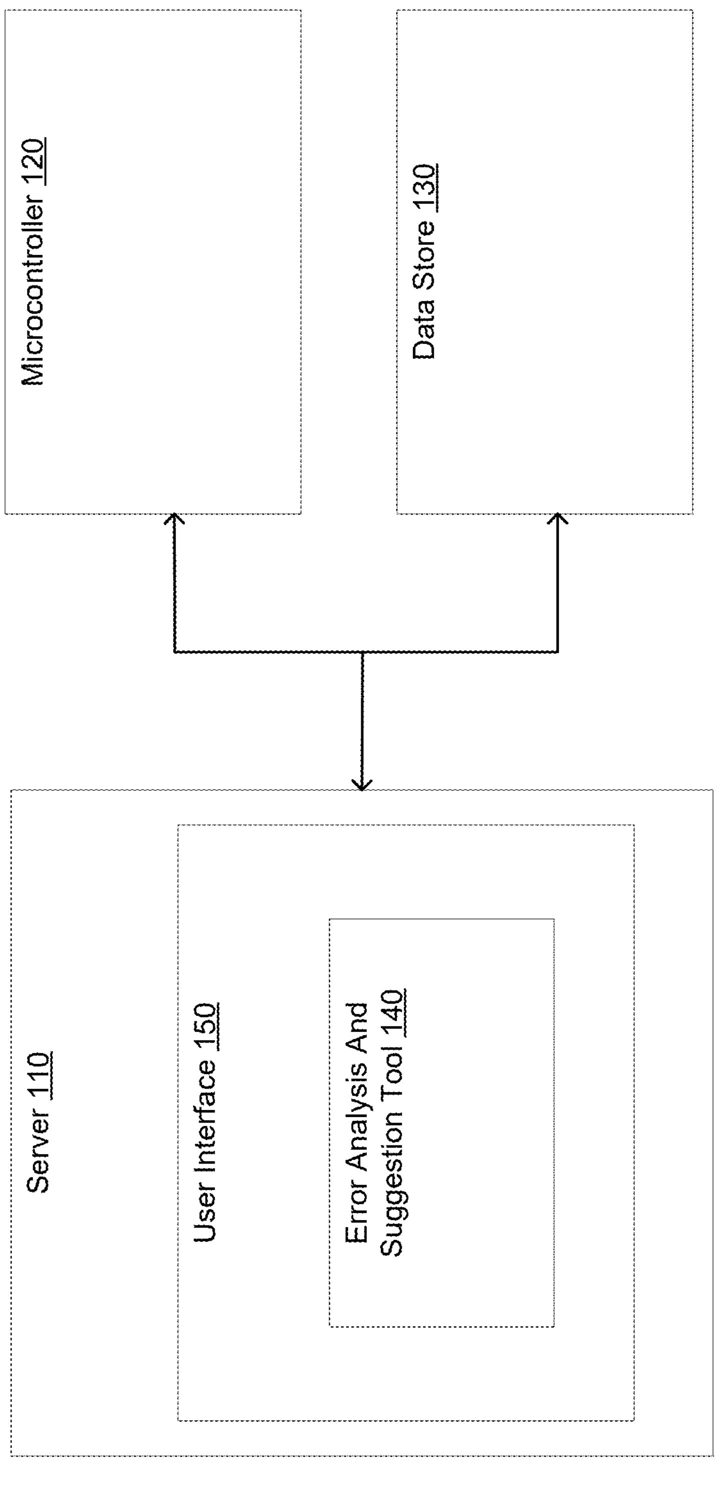
FIG. 1 illustrates an example system architecture, in accordance with implementations of the present disclosure.

Aspects of the present disclosure relate to generating suggested modifications for configuring and training an automatic speech recognition model. Speech-based discriminative tasks include keyword spotting, wake word detection, phoneme spotting, emotion detection, transcription, natural language processing (NLP), automatic speech recognition (ASR), etc. An automatic speech recognition model may be trained to perform the speech-based discriminative tasks. Initially, relevant data such as audio recordings paired with transcriptions or speaker labels is collected and preprocessed. This involves cleaning the audio, removing noise, and converting it into a suitable format for analysis. Various model architectures such as deep neural networks (DNNs), convolutional neural networks (CNNs), recurrent neural networks (RNNs), or transformer-based models are then selected based on the specific task at hand, whether it is speech recognition, speaker identification, or another discriminative task.

These models are trained using the prepared data, with the objective of minimizing a chosen loss function by adjusting model parameters. Validation ensures that the trained model generalizes well to unseen data, while testing assesses its performance on a separate dataset. The model's accuracy, precision, recall, and other metrics are evaluated to gauge its effectiveness. Through iterative refinement, including error analysis and fine-tuning, the model's performance is improved. However, during testing, unexpected drops in performance may occur. To address this, mispredictions, such as misclassifications, are saved for thorough error analysis. Identifying meaningful patterns and/or trends from these mispredictions can be challenging, particularly for individuals lacking deep expertise in speech-based discriminative tasks. As a result, after the time-consuming processes of error analysis, increasing the model or training set size may be attempted, leading to higher computational costs.

Aspects and embodiments of the present disclosure address these and other limitations of the existing technology by generating suggested modifications for configuring and training an automatic speech recognition model. More specifically, one or more suggested modifications to data augmentation, configuration settings of automatic speech recognition model, training dataset, and/or test dataset is generated, based on the test dataset and an automatic speech recognition model. In some embodiments, one or more environmental distributions of the test dataset is generated by the test dataset. Environmental distributions of the test dataset refer to the pattern and/or spread of data points within the test dataset across different environmental aspects of a speech signal.

In some embodiments, one or more latent representation (from at least one layer of the automatic speech recognition model) is flagged as outliers and/or misprediction. In other words, the one or more latent representation deviates from an expected outcome (e.g., a ground truth or a pattern captured by the automatic speech recognition model). Outliers refer to data points that deviate significantly from the typical patterns captured by the internal representations learned by models during training, and misprediction refers to the situation where a machine learning model makes an incorrect prediction or classification for a given input data point that deviate from a ground truth associated with the given input data point. Thus, the one or more suggested modifications to data augmentation, configuration settings of automatic speech recognition model, training dataset, and/or test dataset is generated based on the environmental distributions and the flagged latent representations. In some embodiments, a visual representation of the environmental distributions, a visual representation of the latent representations of one or more layers of the automatic speech recognition model, and/or the one or more suggested modifications is provided via a user interface.

Aspects of the present disclosure overcome these deficiencies and others by improving error analysis of the automatic speech recognition model, thereby increasing the computationally efficient and accuracy of the automatic speech recognition model.

FIG. 1 illustrates an example system architecture 100, in accordance with implementations of the present disclosure. System architecture 100 (also referred to as "system" herein)

includes a server 110 (also referred to as "server" herein) and a microcontroller 120 that are communicatively coupled to each other. System 100 also includes a data store 130 communicatively coupled to server 110. Server 110 may be a computing device (e.g., a desktop computer, a laptop computer, a mainframe computer, a server computer, etc.).

In some implementations, data store 130 is a persistent storage capable of storing trained neural networks. Data store 130 can be hosted by one or more storage devices, such as main memory, magnetic or optical storage-based disks, tapes or hard drives, Network Attached Storage (NAS), Storage Attached Network (SAN), and so forth. In some implementations, data store 130 can be a network-attached file server, while in other embodiments, data store 130 can be some other type of persistent storage such as an object-oriented database, a relational database, and so forth, that may be hosted by server 110 via the network.

Data store 130 may include test dataset and automatic speech recognition model. Test dataset refers to a separate dataset that is used to evaluate the performance of automatic speech recognition model. Test dataset is usually distinct from the training dataset and is not used during the training process. Instead, it serves as an independent set of examples that automatic speech recognition model has not seen before, allowing for an unbiased assessment of its performance. Test dataset typically consists of input samples or instances and may be paired with a corresponding ground truth labels or targets. The automatic speech recognition model is a trained machine learning model that is trained to perform speech-based discriminative task such as, keyword spotting, wake word detection, phoneme spotting, emotion detection, transcription, natural language processing (NLP), or automatic speech recognition.

Server 110 includes an error analysis and suggestion tool (or analysis tool 140) used to generate suggested modifications for configuring and training an automatic speech recognition model. More specifically, analysis tool 140 generates, based on the test dataset and an automatic speech recognition model, one or more suggested modifications to data augmentation, configuration settings of automatic speech recognition model, training dataset, and/or test dataset. In some embodiments, analysis tool 140 generates, based on the test dataset, one or more environmental distributions of the test dataset (e.g., environmental distributions). Environmental distributions of the test dataset refer to the pattern and/or spread of data points within the test dataset across different environmental aspects of a speech signal.

In some embodiments, analysis tool 140 flags, based on the test data and the automatic speech recognition model, one or more latent representations (from at least one layer of the automatic speech recognition model) as outliers and/or mispredictions. Latent representation refers to essential features and patterns present in an input data point, which are relevant for the task the model is trained to perform. Accordingly, outliers refer to data points that deviate significantly from the typical patterns captured by the internal representations learned by models during training, and misprediction refers to the situation where a machine learning model makes an incorrect prediction or classification for a given input data point.

Tool 140 generates, based on the environmental distributions and the flagged latent representations, the one or more suggested modifications to data augmentation, configuration settings of automatic speech recognition model, training dataset, and/or test dataset. The one or more suggested modifications can be used to modify data augmentation parameters used to generate the training dataset, configuration settings of the automatic speech recognition model, training dataset, and/or test dataset. Tool 140 may include a user interface that provides a user the ability to interact with a visual representation of the environmental distributions, a visual representation of the latent representations of one or more layers of the automatic speech recognition model, and the one or more suggested modifications.

Data augmentation refers to a technique used in machine learning and deep learning to increase the size and diversity of training datasets by artificially creating new data samples through transformations applied to existing data points. Configuration settings of automatic speech recognition model many include parameters and/or hyperparameters. Parameters of automatic speech recognition model refers to various aspects of the architecture of automatic speech recognition model, such as the number of layers, the number of neurons or units in each layer, activation functions, and any other architectural choices which influence how the model learns from the training data. They provide the blueprint for how the model processes input data and generates output predictions. Hyperparameters of automatic speech recognition model refers to settings that control the training process itself, rather than the model's architecture, such as the learning rate, batch size, optimizer choice, regularization, weight initialization, and the number of epochs.

Figure 2:
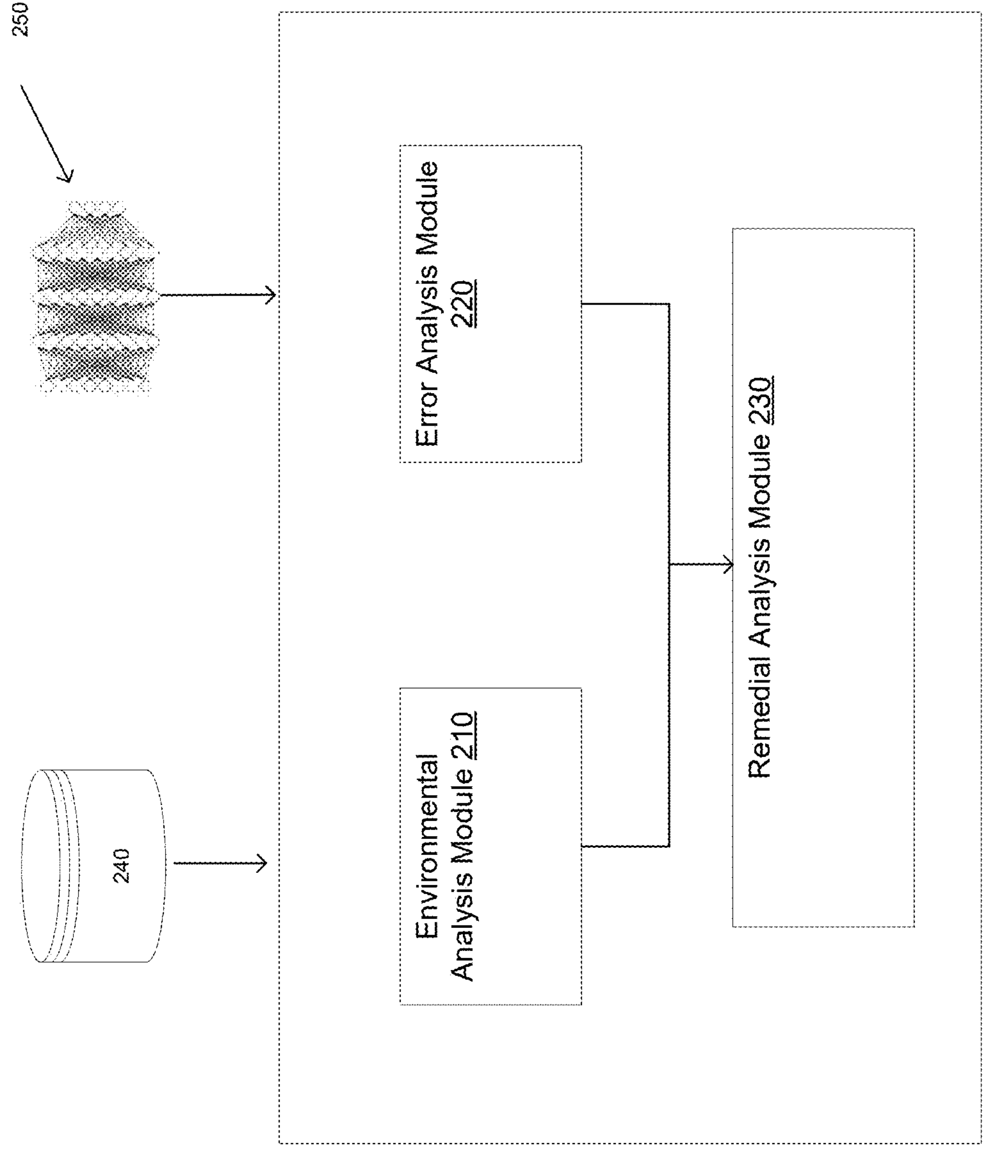
FIG. 2 illustrates an example error analysis and suggestion tool, in accordance with implementations of the present disclosure.
Figure 2:

FIG. 2 illustrates an example error analysis and suggestion tool, in accordance with implementations of the present disclosure. Error analysis and suggestion tool (or analysis tool 200) (similar to analysis tool 140 of FIG. 1). Tool 200 includes an environmental analysis module 210, an error analysis module 220, and a remedial analysis module 230.

Tool 200 may identify a test dataset 240 and/or a trained machine learning model (e.g., automatic speech recognition model 250). Environmental analysis module 210 may generate environmental distributions of the test dataset 240. As described above briefly, the environmental distributions of the test dataset 240 include a distribution across different environmental aspects of a speech signal, such as such as attenuation level (decibels relative to full scale (dBFS)), noise conditions (SNR), short-time objective intelligibility (STOI), and/or room impulse response strength (RT60), for example. Environmental analysis module 210 may store the environmental distributions of the test dataset 240 in a data store (e.g., data store 130 of FIG. 1). Environmental analysis module 210 may provide the environmental distributions of the test dataset 240 for display in the user interface (e.g., user interface 150).

Error analysis module 220 may identify and flag one or more latent representation from one or more layers of automatic speech recognition model 250 that are outliers and/or mispredictions. Error analysis module 220 may store the flagged latent representations in a data store (e.g., data store 130 of FIG. 1). Error analysis module 220 may rank the flagged latent representations based on one or more performance indicators (e.g., confidence score, cross entropy loss, intra-class variance, inter-class variance, or intra-class distance). Additionally, error analysis module 220 may provide a visual representation of one or more layers of automatic speech recognition model. More specifically, each visual representation of a layer refers to the latent representations outputted by the layer. Error analysis module 220 may highlight the flagged latent representations in the visual representation of the layer.

Remedial analysis module 230 may generate, based on the environmental distributions and/or the flagged latent representations, one or more suggested modifications (e.g., suggested modifications). More specifically, the suggested modifications provide suggestions on how to modify data augmentation parameters, configuration settings of automatic speech recognition model, training dataset, and/or test dataset 240. Remedial analysis module 230 may generate, based suggested modifications, settings file(s) (e.g., a JavaScript Object Notation (JSON) file or any suitable human readable format).

In some embodiments, the suggested modifications and/or the settings file(s) may be applied to one or more aspects of configuring and training of the automatic speech recognition model. More specifically, the training dataset and/or automatic speech recognition model 250 may be modified based on the suggested modifications and/or the settings file(s). For example, the suggested modifications and/or the settings file(s) may be used to modify the data augmentation, configuration settings of automatic speech recognition model, training dataset (in some instances the test dataset 240). Thus, further training of the automatic speech recognition model 250 may be performed with the modified training dataset and/or the modified automatic speech recognition model.

FIG. 3A illustrates an example environmental analysis module, in accordance with implementations of the present disclosure. Environmental analysis module 300 (similar to environmental analysis module 210 of FIG. 1) includes distribution generation component 310 and distribution visualization component 320.

Environmental analysis module 300 may receive test dataset. Responsive to receiving test dataset, distribution generation component 310 generates one or more environmental distributions across different environmental aspects of a speech signal (e.g., a plurality of environmental distributions). Each environmental distribution refers to how test dataset is spread or organized across one or more environmental aspects. The environmental aspects, such as attenuation level (dBFS), noise conditions (SNR), short-time objective intelligibility (STOI), and/or room impulse response strength (RT60) may be analyzed from test dataset and/or metadata of each data point of the test dataset. Distribution generation component 310 may store each environmental distribution of the plurality of environmental distributions as a data array in a data store (e.g., data store 130 of FIG. 1).

Metadata may be embedded in each data point of test dataset (e.g., a header) or stored in a separate database and associated with each data point of the test dataset. Metadata for a data point can include, for example, transcriptions, speaker information, recording conditions, timestamps, language or dialect, and annotations or labels. Transcriptions refers to text corresponding to spoken words in the audio recordings. Speaker information refers to details about the speaker(s) in the audio recordings, such as gender, age, accent, language, or identity. Recording conditions refers to factors such as recording location, environment (indoor/outdoor), background noise level, microphone type, sampling rate, and audio format. Timestamps refer to the start and end times of each segment or utterance within the audio recordings. Language or dialect refers to the language or dialect spoken in the audio recordings. Annotations or labels refers to specific semantic information or annotations related to the content of the speech, such as named entities, keywords, topic categories, or semantic roles.

Distribution visualization component 320 may generate a visual representation of each environmental distribution of the plurality of environmental distributions. The visual representation of an environmental distribution can be, for example, a histogram, a bar chart, a heatmap, a cumulative distribution function, or a probability density function. It is important to note that this list of visual representation for an environmental distribution is not an exhaustive list but rather an exemplary list. Distribution visualization component 320 can display, via the user interface (e.g., the user interface 150 of FIG. 1), the visual representation of each environmental distribution of the plurality of environmental distributions. Distribution visualization component 320 may store each environmental distribution of the plurality of environmental distributions as a visual representation in data store 130.

Figure 3B:
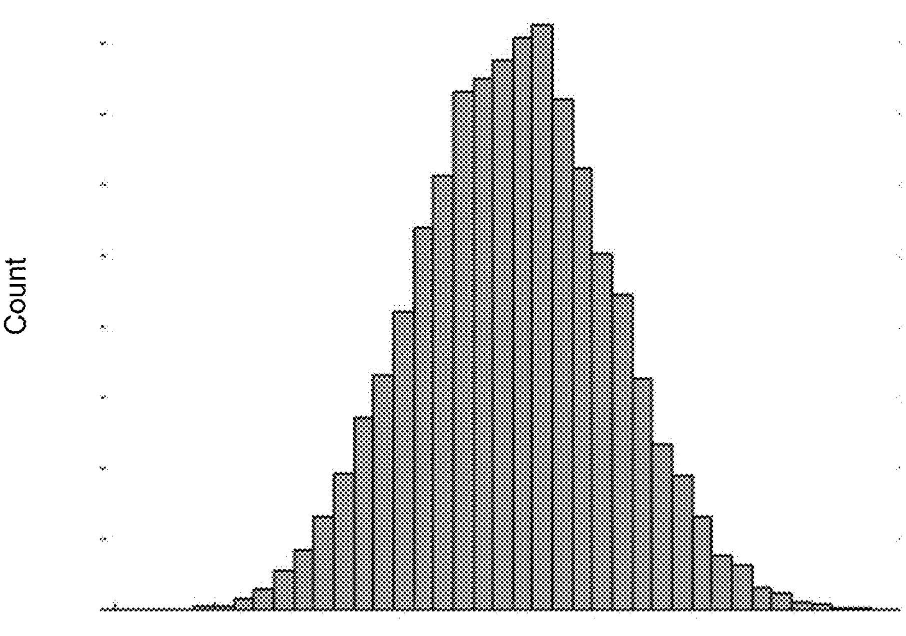
FIG. 3B illustrates an example environmental distribution generated by the environmental analysis module, in accordance with implementations of the present disclosure.

FIG. 3B illustrates an example environmental distribution generated by the environmental analysis module, in accordance with implementations of the present disclosure. Environmental distribution indicates how a test dataset is spread or organized across an environmental aspect (e.g., attenuation level (dBFS), noise conditions (SNR), short-time objective intelligibility (STOI), and/or room impulse response strength (RT60)). Accordingly, an value corresponding to the environmental aspect (e.g., an environmental metric) is calculated for each data point of the test dataset by the environmental analysis module. The environmental analysis module may generate a visual representation 350 of the environmental distribution. Visual representation 350 may be a histogram which divides a range of environmental metrics obtained from all data points of the test data into intervals called "bins.". Bins are consecutive, non-overlapping intervals, usually of equal size but not required to be. "Counts" refers to a number of data points of the test data set that has an environmental metric that falls within into each bin. Thus, the x-axis of the visual representation 350 labeled as "Bins for Environmental Aspect" represents the bins obtained from dividing the range of environmental metrics associated with an environmental aspect for the test data set, and the y-axis of the visual representation 350 labeled as "count" represents numerical values that indicate a number of data points of the test dataset that fall within a specific bin.

Figure 4:
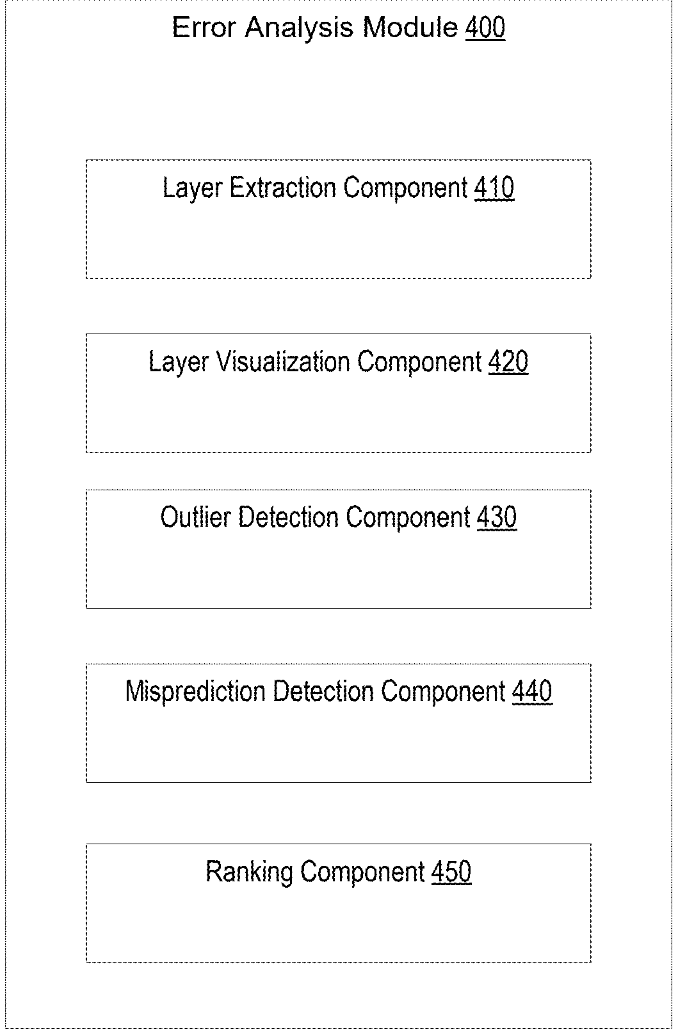
FIG. 4 illustrates an example error analysis module of the error analysis and suggestion tool, in accordance with implementations of the present disclosure.

FIG. 4 illustrates an example error analysis module, in accordance with implementations of the present disclosure. Error analysis module 400 (similar to error analysis module 220 of FIG. 1) includes a layer extraction component 410, a layer visualization component 420, an outlier detection component 430, a misprediction detection component 440, and a ranking component 450.

Error analysis module 400 may receive test dataset and automatic speech recognition model. Layer extraction component 410 may input test dataset into automatic speech recognition model. Layer extraction component 410, may capture, from each layer of automatic speech recognition model (similar to automatic speech recognition model 250 of FIG. 2), a latent representation for each data point of test dataset. Thus, layer extraction component 410 obtains a plurality of latent representations associated with test dataset for each layer of the automatic speech recognition model.

Layer visualization component 420 may receive, from layer extraction component 410, a plurality of latent representation associated with a layer of the automatic speech recognition model. In some embodiments, layer visualization component 420 may receive a plurality of latent representation associated with a last layer of the automatic speech recognition model. In some embodiments, layer visualization component 420 may receive a plurality of latent representation associated with a specified layer of the automatic speech recognition model. The specified layer may be provided by a user via the user interface (e.g., the user interface 150 of FIG. 1). In some embodiments, layer visualization component 420 may receive a plurality of latent representation associated with each layer of the automatic speech recognition model.

Layer visualization component 420 may display, via the user interface (e.g., the user interface 150 of FIG. 1), a visual representation of the plurality of latent representations (e.g., a scatter plot) based on their probability of belonging to a class. Layer visualization component 420 plots the plurality of latent representation in a two- or three-dimensional space using their corresponding probability value. The scatter plot may visually provide a global view of the distribution and structure of the plurality of latent representation in the learned feature space, and a local view of the distribution and structure of a subset of the plurality of latent representation in the learned feature space. In other words, layer visualization component 420 may display, via the user interface (e.g., the user interface 150 of FIG. 1), a scatter plot of a last layer, a specified layer, or each layer (or respective layer) of the automatic speech recognition model.

Layer visualization component 420 may receive, via the user interface 150, input associated with interaction with the visual presentation of scatter plot. In some embodiments, the input may be a selection of a latent representation in the scatter plot. Responsive to selecting a latent representation in the scatter plot, layer visualization component 420 may display and/or output information associated with a data point of the test dataset associated with the latent representation. For example, layer visualization component 420 may visually display metadata associated with a corresponding data point of the test dataset and/or output an auditory format of the speech signal of the data point of the test dataset. In some embodiments, the input may be an action that flags a latent representation in the scatter plot as outliers and/or mispredictions. Responsive to flagging the latent representation, layer visualization component 420 may update a list of flagged latent representations maintained in the data store (e.g., data store 130 of FIG. 1) to include the flagged latent representation. Layer visualization component 420 may visually distinguish (e.g., highlight), in the scatter plot, each latent representation included in the list of flagged latent representations.

Outlier detection component 430 may identify outliers in the plurality of latent representations from a last layer, a specified layer, or each layer (or respective layer) of the automatic speech recognition model. In some embodiments, outlier detection component 430 may identify outliers using an anomaly detection algorithm, such as density-based spatial clustering of applications with noise (DBSCAN). Outlier detection component 430 may partition the plurality of latent representations into clusters and input them into the anomaly detection algorithm. The anomaly detection algorithm can be applied within each cluster to identify outliers relative to the other latent representations in the cluster. For example, latent representations that are far from the cluster centroid or have unusually low density within the cluster may identified as outliers by the anomaly detection algorithm thereby flagged by outlier detection component 430 as outliers.

Additionally, the anomaly detection algorithm can detect outliers by considering relationships between clusters. Latent representations that do not belong to any cluster or are located in regions of low cluster density may identified as outliers by the anomaly detection algorithm thereby flagged by outlier detection component 430 as outliers. Alternatively, outliers may be identified based on deviations from expected relationships between clusters, such as unusual transitions or patterns. Outlier detection component 430 may update the list of flagged latent representations maintained in the data store (e.g., data store 130 of FIG. 1) to include the latent representations flagged as outliers.

Misprediction detection component 440 may identify mispredictions in a plurality of latent representations from a last layer, a specified layer, or each layer (or respective layer) of the automatic speech recognition model. In some embodiments, for each latent representation of the plurality of latent representations, misprediction detection component 440 compares a respective latent representation with their ground truth. As previously described, the data point of the test dataset that produced the respective latent representation can include a ground truth label. If the respective latent representation differs from their ground truth, misprediction detection component 440 may visually highlight (e.g., flag) the respective latent representation as a misprediction. Misprediction detection component 440 may update the list of flagged latent representations maintained in the data store (e.g., data store 130 of FIG. 1) to include the latent representations flagged as mispredictions.

Ranking component 450 may receive, via the user interface 150, a selection of a performance indicator to rank the list of flagged latent representations. The performance indicator can be, for example, confidence score, cross entropy loss, intra-class variance, inter-class variance, or intra-class distance. Ranking component 450 may calculate, for each latent representation of the list of flagged latent representations, a metric associated with the selected performance indicator.

Ranking component 450 ranks the list of flagged latent representations in ascending order (e.g., lowest to highest) or descending order (e.g., highest to lowest) based on the metrics. The order in which the list of flagged latent representations are ranked is based on whether lower metrics of the selected performance indicator contribute to the latent representation's designation as an outlier and/or a misprediction versus higher metrics of the selected performance indicator. If lower metrics of the selected performance indicator contributory, then the list of flagged latent representations are ranked in ascending order, otherwise the list of flagged latent representations are ranked in descending order. Thus, ranking component 450 modifies the ordering of the list of flagged latent representations maintained in the data store (e.g., data store 130 of FIG. 1).

Confidence score represents the level of certainty or probability that a model assigns to its prediction, typically obtained as the normalized exponential outputs probabilities of the automatic speech recognition model, where each class is assigned a probability, and the sum of all probabilities equals 1. Cross entropy loss, also known as log loss, measures the difference between the predicted probability distribution output by the automatic speech recognition model and the true probability distribution (ground truth) of the labels.

Intra-class variance measures the variability or dispersion of data points within the same class or category, low intra-class variance indicates that data points within the same class are similar to each other, while high intra-class variance suggests that data points within the same class are more diverse or spread out. Inter-class variance measures the dissimilarity or separation between different classes or categories, high inter-class variance indicates that different classes are well-separated, making classification easier, while low inter-class variance suggests that classes overlap, leading to classification challenges.

Intra-class distance is the average distance or dissimilarity between data points belonging to the same class measuring the compactness or cohesion within each class. Low intra-class distance indicates that data points within the same class are close to each other in the feature space, while high intra-class distance suggests that data points within the same class are more scattered or distant from each other.

FIG. 5 illustrates an example remedial analysis module, in accordance with implementations of the present disclosure. Remedial analysis module 500 (similar to remedial analysis module 230 of FIG. 1) includes a suggestion generation component 510.

Remedial analysis module 230 may receive the plurality of environmental distributions and the list of flagged latent representations. Based on the plurality of environmental distributions and/or the list of flagged latent representations, suggestion generation component 510 may provide suggested modifications to data augmentation, configuration settings of automatic speech recognition model, training dataset, and/or test dataset.

In some embodiments, suggestion generation component 510 may receive, via user input, training dataset distributions. The training dataset distributions refers to the distribution of speech signals across different phonemes, words, speakers, languages, and environmental conditions. Suggestion generation component 510 may compare the training dataset distributions and the plurality of environmental distributions to identify deviations in one or more aspects of the speech signal. For example, suggestion generation component 510 may determine that there is a gap between a distribution of the training dataset distributions and an environmental distribution of the plurality of environmental distributions (e.g., SNR distribution). Thus, suggestion generation component 510 may suggest a specific data augmentation parameter (e.g., additive noise) with a specific value to adjust one or more data points in the training dataset to match one or more data points in the test dataset.

In some embodiments, suggestion generation component 510 determines, for each latent representation of the list of flagged latent representations, whether one or more metadata attributes of a data point of the test dataset associated with a respective latent representation matches one or more metadata attributes of other data points of the test dataset associated with other latent representations clustered with the respective latent representation. Responsive to determining there is a match, suggestion generation component 510 may determine that the training dataset does not include a predetermined number of data points sufficient to accurately handle the one or more metadata attributes (e.g., not well handled in the training dataset). Responsive to determining that the one or more metadata attributes is not well handled in the training dataset, suggestion generation component 510 may suggest modification of the training dataset by including more data points that represent the one or more metadata attributes. Otherwise, suggestion generation component 510 may determine that the one or more metadata attributes is well handled in the training dataset and suggest no modification of the training dataset.

In some embodiments, suggestion generation component 510 determines, for each latent representation of the list of flagged latent representations, whether a respective latent representation belongs to a different cluster (e.g., incorrectly clustered) based on the metadata of the respective latent representation. For example, the ground truth of the respective latent representation may indicate that the latent representation should not be in a current cluster. Responsive to determining that respective latent representation was incorrectly clustered, suggestion generation component 510 may suggest modification to configuration settings of the automatic speech recognition model based on the metric of the respective latent representation. As previously described, the metric was calculated and used to rank the list of flagged latent representations. The amount of modification suggested to a specific configuration setting is determined by a difference between a predefined expected metric of latent representations in a correct cluster and the metric of the respective latent representation.

In one example, suggestion generation component 510 may suggest modification to regularization (e.g., dropout, weight decay) to improve generalization and reduce overconfidence in predictions if the metric corresponds to confidence score. In another example, suggestion generation component 510 may suggest modification to the learning rate, optimizer, and/or weight initialization to optimize convergence and reduce loss if the metric corresponds to cross entropy loss. In yet another example, suggestion generation component 510 may suggest modification to the capacity (e.g., number of layers, hidden units) to better capture the variability within each class if the metric corresponds to intra-class variance.

In yet another example, suggestion generation component 510 may suggest modification to the architecture (e.g., increase layer width, add skip connections) to improve class separability if the metric corresponds to is inter-class variance. In yet another example, suggestion generation component 510 may suggest modification to the regularization techniques (e.g., add noise to inputs) to increase the diversity of data points within each class if the metric corresponds to intra-class distance.

In some embodiments, suggestion generation component 510 may suggest creating an additional training dataset for further training of the automatic speech recognition model which includes latent representations of the list of flagged latent representations that were incorrectly clustered and those that were not confidently clustered but were correctly clustered. In some embodiments, suggestion generation component 510 may receive, via the user input, an input that correspond to an action to select one or more latent representation of the list of flagged latent representations to exclude data points of the test dataset associated with the selected one or more latent representation, and/or data points of the training dataset similar to the data points of the test dataset associated with the selected one or more latent representation.

Suggestion generation component 510 may display, via the user interface (e.g., the user interface 150 of FIG. 1), a list of suggestions. Suggestion generation component 510 may receive, via the user interface, input indicating that the user wishes to automatically implement the list of suggestions. Alternatively, suggestion generation component 510 may receive, via the user interface, input indicating that the user wishes to manually implement the list of suggestions Accordingly, suggestion generation component 510 may generate, based on the list of suggestions, one or more settings files. Each of the one or more settings files may be formatted in JavaScript Object Notation (JSON). In some embodiments, suggestion generation component 510 may generate a document providing the list of suggestions. In some embodiments, the one or more settings files may be used to adjust and/or modify data augmentation parameters used to generate the training dataset (or additional training dataset), one or more configurating settings of the automatic speech recognition model, the testing dataset, and/or the test dataset.

Figure 6:
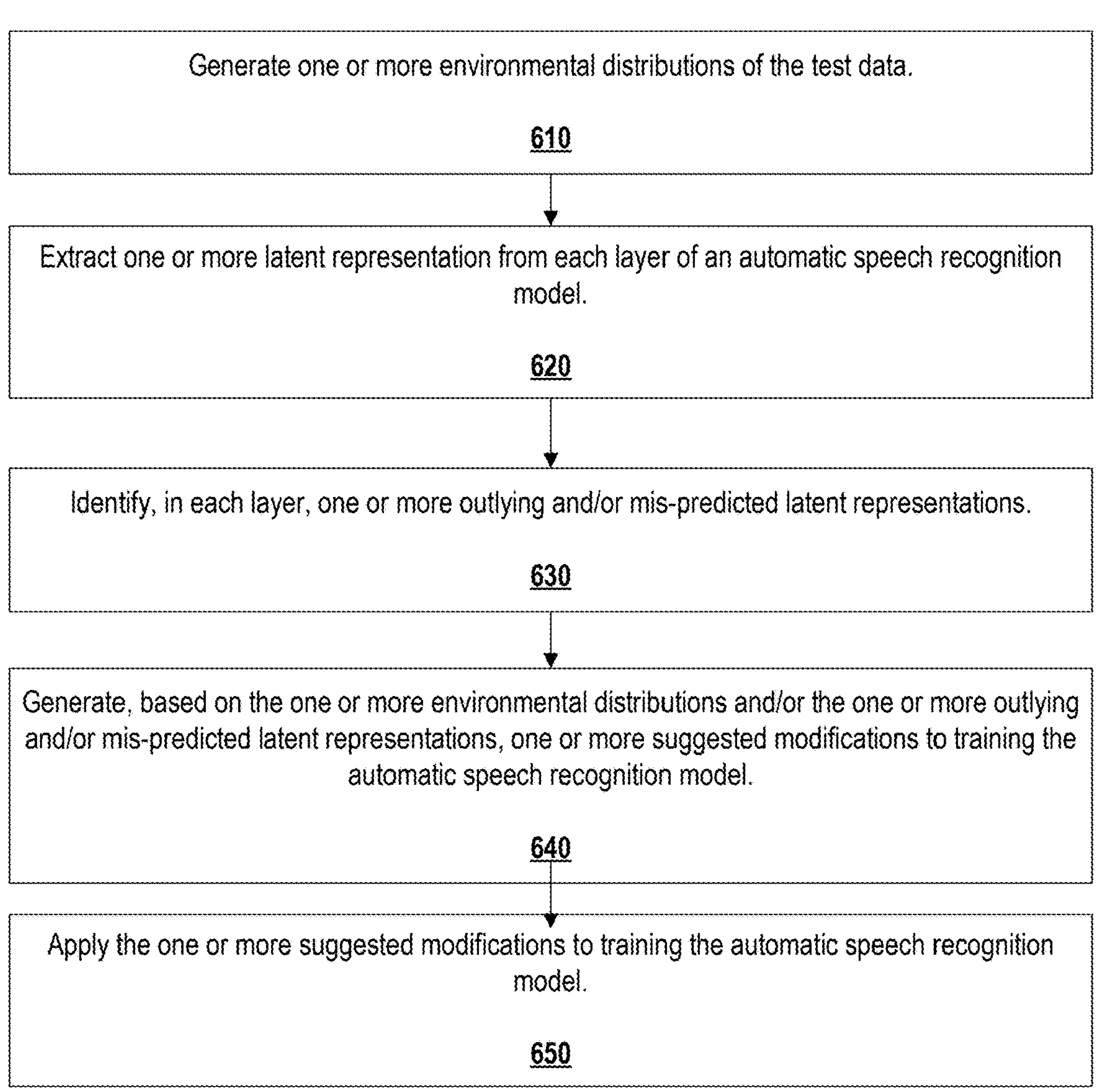
FIG. 6 depicts a flow diagram of an example method for generating suggested modifications for configuring and training an automatic speech recognition model, in accordance with implementations of the present disclosure.

FIG. 6 depicts a flow diagram of an example method 600 for generating suggested modifications for configuring and training an automatic speech recognition model, in accordance with implementations of the present disclosure. Method 600 can be performed by processing logic that can include hardware (circuitry, dedicated logic, etc.), software (e.g., instructions run on a processing device), or a combination thereof. In one implementation, some, or all of the operations of method 600 can be performed by one or more components of analysis tool 140 of FIG. 1. In some embodiments, some or all of the operations of method 800 can be performed by analysis tool 140 of FIG. 1, as described above.

At operation 610, the processing logic generates one or more environmental distributions of the test data. As previously described, each environmental distribution refers to how the test dataset is spread or organized across one or more environmental aspects. The environmental aspects, such as attenuation level (dBFS), noise conditions (SNR), short-time objective intelligibility (STOI), and/or room impulse response strength (RT60) may be analyzed from test dataset and/or metadata of each data point of the test dataset.

At operation 620, the processing logic extract one or more latent representation from each layer of an automatic speech recognition model. As previously described, the test dataset is inputted into the automatic speech recognition model with each data point of test dataset a latent representation is outputted for a layer. Thus, a plurality of latent representations associated with test dataset is outputted for each layer of the automatic speech recognition model. In some embodiments, the plurality of latent representation associated with each layer of the automatic speech recognition model may be visually presented (e.g., a scatter plot).

At operation 630, the processing logic identifies, in each layer, one or more outlying and/or mis-predicted latent representations. As previously described, one or more outlying latent representations may be identified, using an anomaly detection algorithm. The plurality of latent representations is partitioned into clusters and input them into the anomaly detection algorithm. The anomaly detection algorithm can identify outliers relative to the other latent representations in the cluster and/or deviations from expected relationships between clusters, such as unusual transitions or patterns. Thus, the latent representations identified by the anomaly detection algorithm are flagged as outlying latent representations. The one or more mis-predicted latent representations is identified by comparing each latent representation with their ground truth. Any latent representation that differs from their ground truth, is flagged as mis-predicted latent representations. In some embodiments, the one or more outlying and/or mis-predicted latent representations may be combined into a list of flagged latent representations and ranked by one or more performance indicators (e.g., confidence score, cross entropy loss, intra-class variance, inter-class variance, or intra-class distance).

At operation 640, the processing logic generates, based on the one or more environmental distributions and one or more outlying and/or mis-predicted latent representations (e.g., list of flagged latent representations), one or more suggested modification to training of the automatic speech recognition model. In some embodiments, as previously described, based on a comparison between the training dataset distributions and the plurality of environmental distributions, one or more suggested modification may be determined by identifying deviations in one or more aspects of the speech signal (e.g., through differences in SNR distributions). In some embodiments, as previously described, based on a comparison between the one or more metadata attributes of a data point of the test dataset associated with a respective latent representation and one or more metadata attributes of other data points of the test dataset associated with other latent representations clustered with the respective latent representation, one or more suggested modification may be determined by determining whether the one or more metadata attributes is handled well in the training dataset. In some embodiments, as previously described, based on whether each latent representation in the list of flagged latent representations belongs to a different cluster (e.g., incorrectly clustered), one or more suggested modification may be determined by determining that a respective latent representation is incorrectly clustered.

The one or more suggested modification may include, for example, modification to regularization (e.g., dropout, weight decay) to improve generalization and reduce overconfidence in predictions and/or increase the diversity of data points within each class, modification to the learning rate, optimizer (e.g., SGD, Adam), and/or weight initialization to optimize convergence and reduce loss, modification to the capacity (e.g., number of layers, hidden units) to better capture the variability within each class, modification to the architecture (e.g., increase layer width, add skip connections) to improve class separability, creating an additional training dataset, etc.

At operation 650, the processing logic applies the one or more suggested modification to training of automatic speech recognition model. As previously described, one or more settings files, generated based on the one or more suggested modifications, may be used to adjust and/or modify data augmentation parameters used to generate the training dataset (or additional training dataset), one or more configurating settings of the automatic speech recognition model, the testing dataset, and/or the test dataset.

Figure 7:
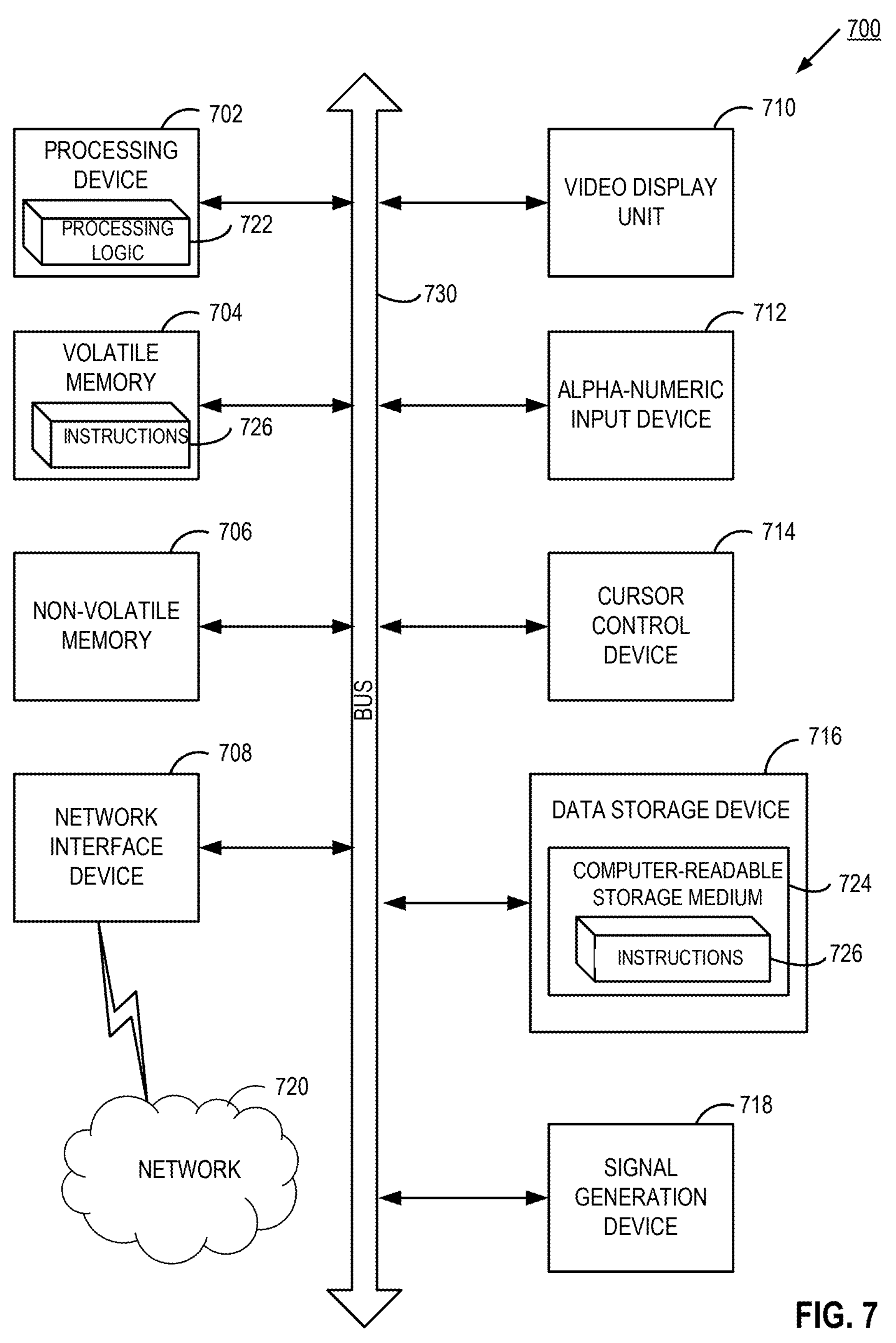
FIG. 7 is a block diagram illustrating an exemplary computer system, in accordance with implementations of the present disclosure.

FIG. 7 is a block diagram illustrating an exemplary computer system 700, in accordance with implementations of the present disclosure. The computer system 700 can correspond to microcontroller 120 and/or data generation module 210 described with respect to FIG. 1 and/or speech-based discriminative task analysis tool 140 described with respect to FIG. 2. Computer system 700 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 750.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices, such as an application-specific integrated circuit (ASIC), a field programmable gate array (FPGA), a digital signal processor (DSP), a network processor, or the like. The processor 702 is configured to execute instructions 726 (e.g., when executed provides groupwise encoding) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, an alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also non-transitory computer-readable storage medium) on which is stored one or more sets of instructions 726 (e.g., when executed provides groupwise encoding) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 726 include instructions for groupwise encoding. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding, or carrying a set of instructions for execution by the machine and that causes the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, refer to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution, and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer-readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include a collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

capturing, by a processing device, from each layer of an automatic speech recognition model processing a test dataset, a plurality of latent representations corresponding to respective data points of the dataset, wherein the test data is distinct from a training dataset used to train the automatic speech recognition model;

generating, based on the test dataset, one or more environmental distributions of the test dataset, wherein each of the one or more environmental distributions characterizes a distribution of the test dataset across different environmental aspects of a speech signal;

detecting, from the plurality of latent representations captured for one or more layers of the automatic speech recognition model processing the test dataset, one or more latent representations that deviate relative to other latent representations of the plurality of latent representations captured for one or more layers of the automatic speech recognition model processing the test dataset;

generating, based on the one or more environmental distributions and the one or more latent representations, one or more modification actions to be applied to at least one of: a data augmentation parameter, a configuration setting of the automatic speech recognition model, the training dataset, or the test dataset, wherein the one or more modification actions compensate for deviations associated with the one or more latent representations;

modifying, based on the one or more modification actions, at least one configuration or parameter of the automatic speech recognition model; and retraining, by the processing device, the automatic speech recognition model based on the modified at least one configuration or training parameter.

2. The method of claim 1, wherein the automatic speech recognition model is trained to perform a speech-based discriminative task which includes one of: keyword spotting, wake word detection, phoneme spotting, emotion detection, transcription, natural language processing (NLP), or automatic speech recognition (ASR).

3. The method of claim 1, wherein modifying, based on the one or more modification actions, at least one configuration or parameter of the automatic speech recognition model comprises:

modifying, based on the one or more modification actions, at least one of: the training dataset or the automatic speech recognition model; and training, using the training dataset, the automatic speech recognition model.

4. The method of claim 1, wherein the one or more modification actions to be applied to at least one of: a data augmentation parameter, a configuration setting of the automatic speech recognition model, the training dataset, or the test dataset includes: modifying data augmentation parameters, modifying configuration settings of the automatic speech recognition model, modifying the test dataset, or modifying the training dataset.

5. The method of claim 1, wherein each of the one or more environmental distributions of the test dataset comprises a distribution of the test dataset across one of: attenuation level, noise conditions, short-time objective intelligibility, or room impulse response strength.

6. The method of claim 1, wherein detecting, from the plurality of latent representations captured for one or more layers of the automatic speech recognition model processing the test dataset, one or more latent representations that deviate relative to other latent representations comprises:

providing the test dataset as input into the automatic speech recognition model;

extracting, at each of the one or more layers of the automatic speech recognition model, a plurality of latent representations of the test dataset outputted by a respective layer of the automatic speech recognition model;

determining one or more mis-predicted latent representations that deviate from a corresponding ground truth;

determining one or more outlying latent representations that deviate from a pattern captured by the automatic speech recognition model; and combining the one or more mis-predicted latent representations and the one or more outlying latent representations to generate the one or more latent representations that deviate relative to other latent representations.

7. The method of claim 1, wherein the one or more latent representations that deviate relative to other latent representations is ranked based on a performance indicator, wherein the performance indicator is one of: confidence score, cross entropy loss, intra-class variance, inter-class variance, or intra-class distance.

8. A system comprising:

a processing device to perform operations comprising:

capturing, from each layer of an automatic speech recognition model processing a test dataset, a plurality of latent representations corresponding to respective data points of the dataset, wherein the test data is distinct from a training dataset used to train the automatic speech recognition model;

generating, based on the test dataset, one or more environmental distributions of the test dataset, wherein each of the one or more environmental distributions characterizes a distribution of the test dataset across different environmental aspects of a speech signal;

detecting, from the plurality of latent representations captured for one or more layers of the automatic speech recognition model processing the test dataset, one or more latent representations that deviate relative to other latent representations of the plurality of latent representations captured for one or more layers of the automatic speech recognition model processing the test dataset;

generating, based on the one or more environmental distributions and the one or more latent representations, one or more modification actions to be applied to at least one of: a data augmentation parameter, a configuration setting of the automatic speech recognition model, the training dataset, or the test dataset, wherein the one or more modification actions compensate for deviations associated with the one or more latent representations;

modifying, based on the one or more modification actions, at least one configuration or parameter of the automatic speech recognition model; and retraining the automatic speech recognition model based on the modified at least one configuration or training parameter.

9. The system of claim 8, wherein the automatic speech recognition model is trained to perform a speech-based discriminative task which includes one of: keyword spotting, wake word detection, phoneme spotting, emotion detection, transcription, natural language processing (NLP), or automatic speech recognition (ASR).

10. The system of claim 8, wherein modifying, based on the one or more modification actions, at least one configuration or parameter of the automatic speech recognition model comprises:

modifying, based on the one or more modification actions, at least one of: the training dataset or the automatic speech recognition model; and training, using the training dataset, the automatic speech recognition model.

11. The system of claim 8, wherein the one or more modification actions to be applied to at least one of: a data augmentation parameter, a configuration setting of the automatic speech recognition model, the training dataset, or the test dataset includes: modifying data augmentation parameters, modifying configuration settings of the automatic speech recognition model, modifying the test dataset, or modifying the training dataset.

12. The system of claim 8, wherein each of the one or more environmental distributions of the test dataset comprises a distribution of the test dataset across one of: attenuation level, noise conditions, short-time objective intelligibility, or room impulse response strength.

13. The system of claim 8, wherein detecting, from the plurality of latent representations captured for one or more layers of the automatic speech recognition model processing the test dataset, one or more latent representations that deviate relative to other latent representations comprises:

providing the test dataset as input into the automatic speech recognition model;

extracting, at each of the one or more layers of the automatic speech recognition model, a plurality of latent representations of the test dataset outputted by a respective layer of the automatic speech recognition model;

determining one or more mis-predicted latent representations that deviate from a corresponding ground truth;

determining one or more outlying latent representations that deviate from a pattern captured by the automatic speech recognition model; and combining the one or more mis-predicted latent representations and the one or more outlying latent representations to generate the one or more latent representations that deviate relative to other latent representations.

14. The system of claim 8, wherein the one or more latent representations that deviate relative to other latent representations is ranked based on a performance indicator, wherein the performance indicator is one of: confidence score, cross entropy loss, intra-class variance, inter-class variance, or intra-class distance.

15. A non-transitory computer-readable storage medium comprising instructions that, when executed by a processing device, cause the processing device to perform operations comprising:

capturing, from each layer of an automatic speech recognition model processing a test dataset, a plurality of latent representations corresponding to respective data points of the dataset, wherein the test data is distinct from a training dataset used to train the automatic speech recognition model;

generating, based on the test dataset, one or more environmental distributions of the test dataset, wherein each of the one or more environmental distributions characterizes a distribution of the test dataset across different environmental aspects of a speech signal;

detecting, from the plurality of latent representations captured for one or more layers of the automatic speech recognition model processing the test dataset, one or more latent representations that deviate relative to other latent representations of the plurality of latent representations captured for one or more layers of the automatic speech recognition model processing the test dataset;

generating, based on the one or more environmental distributions and the one or more latent representations, one or more modification actions to be applied to at least one of: a data augmentation parameter, a configuration setting of the automatic speech recognition model, the training dataset, or the test dataset, wherein the one or more modification actions compensate for deviations associated with the one or more latent representations;

modifying, based on the one or more modification actions, at least one configuration or parameter of the automatic speech recognition model; and retraining the automatic speech recognition model based on the modified at least one configuration or training parameter.

16. The non-transitory computer-readable storage medium of claim 15, wherein the automatic speech recognition model is trained to perform a speech-based discriminative task which includes one of: keyword spotting, wake word detection, phoneme spotting, emotion detection, transcription, natural language processing (NLP), or automatic speech recognition (ASR).

17. The non-transitory computer-readable storage medium of claim 15, wherein modifying, based on the one or more modification actions, at least one configuration or parameter of the automatic speech recognition model comprises:

modifying, based on the one or more modification actions, at least one of: the training dataset or the automatic speech recognition model; and training, using the training dataset, the automatic speech recognition model.

18. The non-transitory computer-readable storage medium of claim 15, wherein the one or more modification actions to be applied to at least one of: a data augmentation parameter, a configuration setting of the automatic speech recognition model, the training dataset, or the test dataset includes:

modifying data augmentation parameters, modifying configuration settings of the automatic speech recognition model, modifying the test dataset, or modifying the training dataset.

19. The non-transitory computer-readable storage medium of claim 15, wherein each of the one or more environmental distributions of the test dataset comprises a distribution of the test dataset across one of: attenuation level, noise conditions, short-time objective intelligibility, or room impulse response strength.

20. The non-transitory computer-readable storage medium of claim 15, wherein detecting, from the plurality of latent representations captured for one or more layers of the automatic speech recognition model processing the test dataset, one or more latent representations that deviate relative to other latent representations comprises:

providing the test dataset as input into the automatic speech recognition model;

extracting, at each of the one or more layers of the automatic speech recognition model, a plurality of latent representations of the test dataset outputted by a respective layer of the automatic speech recognition model;

determining one or more mis-predicted latent representations that deviate from a corresponding ground truth;

determining one or more outlying latent representations that deviate from a pattern captured by the automatic speech recognition model; and combining the one or more mis-predicted latent representations and the one or more outlying latent representations to generate the one or more latent representations that deviate relative to other latent representations.

* * * * *